United States Patent
De Lutiis et al.

(10) Patent No.: US 8,670,316 B2
(45) Date of Patent: Mar. 11, 2014

(54) METHOD AND APPARATUS TO CONTROL APPLICATION MESSAGES BETWEEN CLIENT AND A SERVER HAVING A PRIVATE NETWORK ADDRESS

(75) Inventors: Paolo De Lutiis, Turin (IT); Luca Viale, Turin (IT); Vito Pistillo, Turin (IT)

(73) Assignee: Telecom Italia S.p.A., Milan (IT)

( * ) Notice: Subject to any disclaimer, the term of this patent is extended or adjusted under 35 U.S.C. 154(b) by 593 days.

(21) Appl. No.: 12/448,646

(22) PCT Filed: Dec. 28, 2006

(86) PCT No.: PCT/EP2006/012570
§ 371 (c)(1),
(2), (4) Date: Oct. 16, 2009

(87) PCT Pub. No.: WO2008/080416
PCT Pub. Date: Jul. 10, 2008

(65) Prior Publication Data
US 2011/0019547 A1    Jan. 27, 2011

(51) Int. Cl.
*H04L 12/26* (2006.01)
(52) U.S. Cl.
USPC .......................................................... 370/231
(58) Field of Classification Search
USPC .................................... 370/230, 231, 235
See application file for complete search history.

(56) References Cited

U.S. PATENT DOCUMENTS

| | | | |
|---|---|---|---|
| 6,703,930 B2 * | 3/2004 | Skinner | 340/539.11 |
| 6,993,595 B1 | 1/2006 | Luptowski et al. | |
| 7,313,145 B1 * | 12/2007 | Bradd et al. | 370/401 |
| 2001/0039623 A1 | 11/2001 | Ishikawa | |
| 2002/0138622 A1 * | 9/2002 | Dorenbosch et al. | 709/227 |
| 2003/0028671 A1 * | 2/2003 | Mehta et al. | 709/245 |
| 2003/0093462 A1 | 5/2003 | Koskelainen et al. | |
| 2004/0103205 A1 | 5/2004 | Larson et al. | |
| 2004/0107285 A1 | 6/2004 | Larson et al. | |
| 2004/0107286 A1 | 6/2004 | Larson et al. | |
| 2005/0013280 A1 | 1/2005 | Buddhikot et al. | |
| 2005/0044352 A1 | 2/2005 | Pazi et al. | |
| 2006/0050719 A1 | 3/2006 | Barr et al. | |

FOREIGN PATENT DOCUMENTS

WO    WO-2006/004556 A1    1/2006

* cited by examiner

*Primary Examiner* — Mark Rinehart
*Assistant Examiner* — Mohammad Anwar
(74) *Attorney, Agent, or Firm* — Finnegan, Henderson, Farabow, Garrett & Dunner, L.L.P.

(57) ABSTRACT

A method to control communication traffic in a communication network. The traffic includes application-level messages between a client and a server having a private network address. The method includes the steps of: sending by the client a request message requesting a service to the server using a first public network address associated with the server; processing the request message at an intermediate logic unit logically positioned between the client and the server; and receiving an alert signal at the intermediate unit. Upon receipt of said alert signal, the method provides for: mapping the private network address of the server to a second public network address associated with the server; and instructing the client to send the request message to the second public network address of the server, routing to the server only request messages directed to the second public network address.

19 Claims, 5 Drawing Sheets

METHOD AND APPARATUS TO CONTROL APPLICATION MESSAGES BETWEEN CLIENT AND A SERVER HAVING A PRIVATE NETWORK ADDRESS

CROSS REFERENCE TO RELATED APPLICATION

This application is a national phase application based on PCT/EP2006/012570, filed Dec. 28, 2006.

TECHNICAL FIELD

The present invention relates to a method and to a system to control traffic in a communication network, in particular to control the presence of malicious traffic. The method and system of the invention are directed to prevent that malicious traffic is received by a server connected to the communication network and at the same time to allow the transmission of legitimate traffic to the server.

TECHNOLOGICAL BACKGROUND

In computer security, attempts to make a computer resource, for example a server, unavailable to its intended users are widely known. Such malicious communications, or attacks, are commonly named "denial-of-service attacks" (DoS attacks), or "distributed DoS" (DDoS), in which servers are forced to shut down or at least to slow down their performance.

This can be achieved by flooding the victims of the attack with a large amount of fake traffic in order to consume the server resources. The attacker plans to do DoS in order to prevent the system from normal work thereby stopping legitimate network traffic. Usually, an application server, like a Web and SIP (Session Initiation Protocol) server, faces the public, insecure, Internet. Then it is potentially victim to DoS.

Generally, even in an intranet scenario, a server could be the target of large volume of traffic, generated, for example, by viruses or misconfigured clients. In particular, a SIP server creates a large number of potential opportunities of DoS attacks that must be recognized and addressed by the telecommunication operators in order to provide the continuity of the services.

Among the different DoS type attacks, the application-level attacks are generally very difficult to be recognized.

In Next Generation Networks (NGNs), protocols as SIP, HTTP and Web Service are used heavily. NGN applications, and most of the added value services provided by telecommunication operators, are however liable to application-level DoS.

These attacks may have severe consequences for the users, which are not capable to obtain the services of interest, often leading to financial and productivity losses.

In recent years, several methods have been developed in order to protect individual servers or private sub-networks from DoS/DDoS attacks.

US 2001/0039623 discloses a detection system, method and apparatus that identifies and eradicates fraudulent requests on a network. Embodiments of the detection system comprise at least one router, a server and an activity monitoring system, which comprises a router arbiter and traffic analyzer, wherein the router arbiter monitors the activity on the router. The router arbiter continuously monitors the router and firewall device to determine if abnormal activity or traffic patterns are emerging. If a determination is made that abnormal activity or abnormal traffic patterns exist, the activity monitoring systems responds by blocking the activity or redirecting the traffic.

The traffic, legitimate or not legitimate, is thus all directed to a "black hole", i.e., a computer that accepts network traffic but does not respond.

US patent application n. 2006/0050719 in the name of Riverhead Networks, Inc. describes a method for communicating which includes coupling a first port of a Layer-3 packet router to receive communication traffic from a network, the traffic including packets destined for a target address, which is accessible via a second port of the router. At the router, the packets that are destined for the target address are diverted to a traffic processor via a third port of the router. The diverted packets are processed in the traffic processor, and returning the processed packets to the router via the third port. At the router, the processed packets are conveyed from the third port to the second port for delivery to the target address.

This method needs the presence of several networks elements and the processing of all traffic packets.

International patent application WO 2006/004556 in the name of Agency for Science, Technology and Research, discloses a method of and a system for filtering data transmissions in a network for protection against malicious communications. The method comprises determining one or more apparent originating addresses sending communications to a first electronic address over a first path; instructing the determined apparent originating address to redirect future communications intended for the first electronic address to a second path; and filtering out communications sent from the determined apparent originating address to the first electronic address over the first path.

In the US patent application 2005/0044352 in the name of Riverhead Networks, Inc., a method for authenticating communication traffic is described, which includes receiving a first request, such as a DNS request, sent over a network from a source address, to provide network information regarding a given domain name. A response is sent to the source address in reply to the first request. When a second request is sent from the source address in reply to the response, the authenticity of the first request is assessed based on the second request.

In order to verify the legitimacy of the first request, a guard system returns a DNS response to the source address containing encoded information, referred to as a "cookie". A legitimate client will submit a new DNS request which will itself contain the cookie. The guard system intercepts this request and checks that it contains the proper cookie. If so, the guard system recognizes the IP address of the client as legitimate, and allows the client to access the DNS server.

A protocol that has been developed to support IP telephony is the Session Initiation Protocol (SIP). SIP is an ASCII-based, application-layer peer-to-peer protocol that can be used to establish, maintain, and terminate calls between two or more end points.

A lot of popular and large scale services will be provided with SIP, thus causing a lot of extra overhead to SIP application servers and networks.

US patent application n. 2003/0093462 relates to a method and apparatus for a distributed server tree where a main server identifies additional server elsewhere and create temporary source identifiers when the main server has a large load or where there are large numbers of users in a particular area or domain that the server is providing a service to. The main server transfers or redirects some users into these additional servers. The main server has thus a much smaller number of users. These other servers with the main server now form a distributed server tree that reduce loading on the main server and provides a more efficient service to the client.

Therefore, according to the described solution, a plurality of interconnected servers is needed in order to cope with the traffic load.

SUMMARY OF THE INVENTION

The present invention relates to a method and a system to control communication traffic in a communication network, in particular to control the presence of malicious traffic.

Servers of interest in the present invention are those servers providing for one or more services, such as, but not limited to, SIP servers or Web servers, which are contacted by clients in order to obtain such services. Messages are exchanged between server and clients in forms of data packets (e.g., Internet packets) wherein the core level of each packet contains an application-layer message.

Herein, the application level—or layer—refers to the level (or levels) above the transport level. In particular, the application level can be represented (in a non-limiting way) by Layer 7 as defined in the Open Systems Interconnection (OSI) Model or by the Level 5 according to the TCP/IP model.

The Applicant has considered a method for filtering the incoming traffic, and thus for reducing the same, which comprises a "guard device" that analyzes all messages addressed to the target server from the network and performs a verification phase, in which the client sending messages to the server or the messages themselves is/are "authenticated". If the message sent by the client passes the "authentication" phase, it is then directed towards the server, otherwise it is dropped.

The authentication phase generally requires a complete parsing of the messages received, in order to examine their content, generally using software at the application-layer, therefore it is demanding from a computational point of view. For example, a possible authentication phase comprises a packet interception step and the screening of the same by the guard device, and sending in response a cookie to the client. This cookie has to be included in the next client's message in order to assess its authenticity.

The Applicant has noted that, if a large amount of messages is received, authenticating all messages imposes a severe burden on the guard device of the server, and thus a relatively high processing capability is necessary for the guard device not to become a bottleneck during a DoS attack.

A main goal of the present invention is to provide a method to control traffic during a malicious attack in which relatively limited computational resources are used.

According to the method of the invention, an intermediate logic unit, which processes the incoming application-level messages directed toward the server, is logically interposed between the server to be protected and the clients. An application-level message sent by a client and requesting the access to a service or to a service functionality or operation is referred in this context to as a request message.

The intermediate logic unit can process all incoming application-level messages directed to the server or it can be configured to process data packets belonging to a particular protocol, like the SIP protocol. In the latter case, the intermediate unit should be configured to recognize the incoming data packets, for instance by some information included in the packet about its destination (e.g., the IP or TCP/UDP port destination address).

The server to be protected is identified in the communication network by a network address, which is preferably a private network address, i.e., it is hidden and not known to clients. The private network address of the server will be referred herein also as the "real" network address of the server, for instance an IP address if the network is an IP network. In case of hiding of the real server address, the intermediate unit associates said real server address to a public address; to which the client should send the request message in order to obtain the service(s) provided by the server. In this way, an association between the real and the public network address of the server is created.

The intermediate unit thus routes the messages sent by clients and directed to the public network address assigned to the server, which may preferably correspond to its own network address, to the server using the aforementioned association between public and private network addresses.

Preferably, a Network Address Translator (NAT) unit included in the intermediate unit performs the mapping between the public network address and the real network address, for example by modifying the address in the IP header of the incoming data packets enclosing the messages.

If the intermediate unit performs no hiding of the real network address of the server in normal traffic condition, said real address is made available to clients by the intermediate unit and mapping is not necessary.

In case of alert, in which a malicious attack is suspected, a new association between a second (new) public network address and the private network address (which remains unchanged) of the server is created. In other words, a new public network address is used by the intermediate unit and a new correspondence between it and the private network address is formed.

Only messages directed to the new (second) public network address are then routed to the server, preferably using a NAT function which performs the network address translation.

The information of the use of a new public network address assigned to the server is then made available to the clients. Preferably, this information is made available via the use of a redirect mechanism, such as a redirect function that can be provided within the SIP protocol. In a preferred embodiment of the invention, the intermediate unit sends to the clients which have contacted the server to the old public network address a redirect message containing the new (second) public network address.

A "virtual" redirection is thus performed, by redirecting the traffic always to the same server (no additional servers are needed), but by creating a new mapping formed between the new public network address and the real private network address.

It is to be understood that only legitimate clients are likely to use the information present in the redirect message sent by the intermediate unit and to reply to the latter by sending the request message to the new public address. In fact, it is necessary to deploy application layer functionalities in order to "understand", i.e., to correctly process, the redirect message and send a new message, and thus any possible subsequent message, in response to the correct new network address of the server.

The number of messages received by the server from the clients is thus noticeably reduced because the malicious clients, which may receive the redirect message too, most likely are not able to respond correctly to the redirect mechanism and will keep on sending messages to the old public address.

The creation of a new mapping between the public network address and the real network address of the server is dynamic in the sense that it is triggered by an event that generates an alert condition, as it will explained more in detail in the following.

It is to be noted that the operations of dynamic change of the public network address of the server (and of redirection) are network-layer processes which involve only very limited burden at the application layer. The intermediate unit can therefore handle a large amount of messages. The intermediate logic unit is preferably a network layer element such a firewall or a router.

In addition, no "authentication" of the clients is made: each client automatically authenticates itself by sending the new message to the correct new public address, no authentication process involves the intermediate unit.

Preferred application protocols to which the solution of the present invention is applied are SIP and HTTP.

BRIEF DESCRIPTION OF THE DRAWINGS

Further features and advantages of a method and a system to control traffic in a communication network according to the invention will become more clearly apparent from the following detailed description thereof, given with reference to the accompanying drawings, where.

PREFERRED EMBODIMENTS OF THE INVENTION

Figure 1:
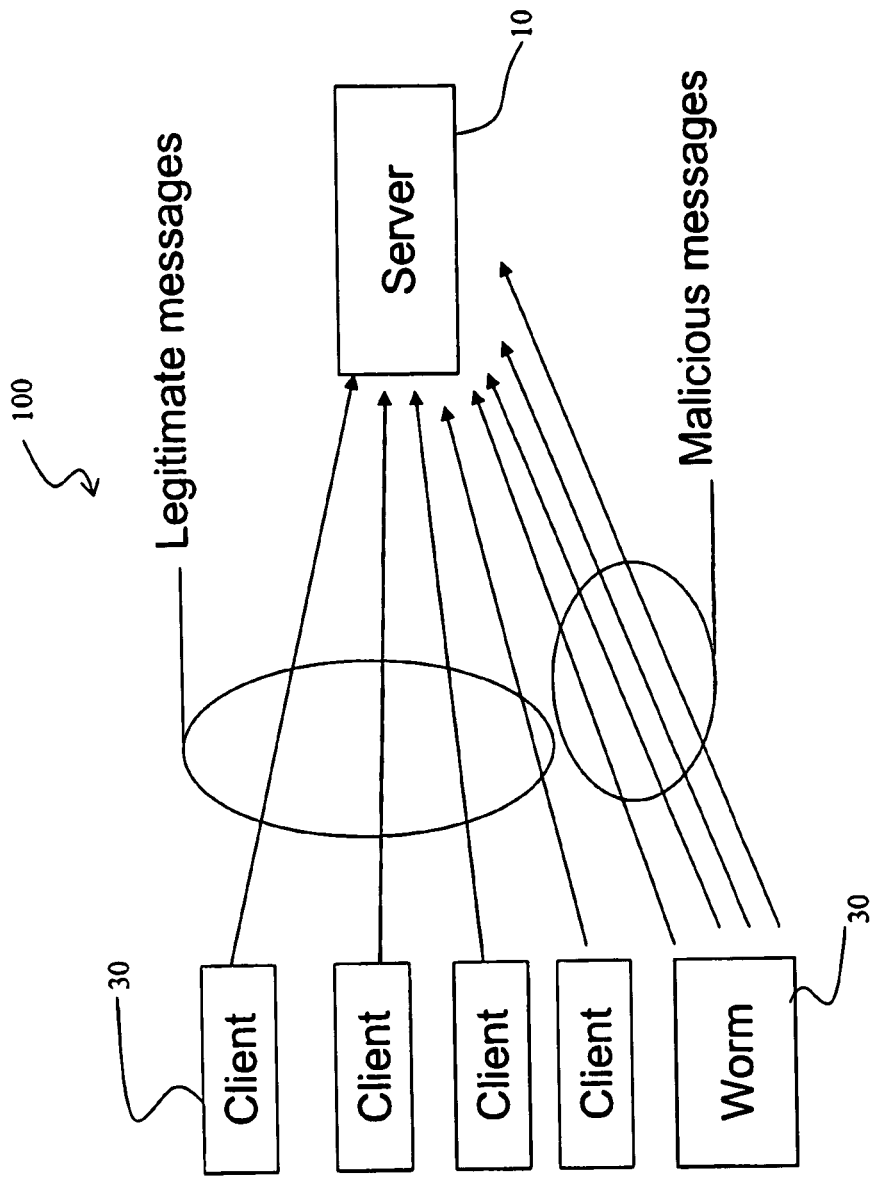
FIG. 1 shows a communication network in which communications between a server and clients according to an embodiment of the present invention is schematically depicted.

With initial reference to FIG. 1, it is shown a block diagram that schematically illustrated a communication network 100. Through the communication network 100, for example a wide-area network (WAN) such as the Internet, a server 10 communicates with clients, all indicated with 30.

In the following, server 10 will be indicated as "target server", which is the server to be protected against external attacks, such as DoS attacks. Even if in FIG. 1 a single server 10 is shown, server 10 may indicate a group of physically distinct computers connected amongst them, such as a cluster of servers, a LAN Intranet, etc.

Clients 30 indicate network elements, such as personal computer, terminal or intelligent apparatus that can be connected to the communication network, which can originate application-level messages and which may be misconfigured and thus cause a DoS situation.

The communications from clients 30 to server 10, for instance request messages for a service, can be legitimate communications or "malicious" (not legitimate) communications with which clients 30 "attack" server 10, for example by sending a large amount of request messages in order to flood the server.

Server 10, as well as clients 30, have each a network-layer address, which identifies the given network element. The network layer address is necessary in order to transmit data packets to their correct destinations. As an example, in the Internet Protocol (IP), the network layer address can be a 32-bit Internet Protocol (IP) address. In a non limiting way, the network layer is the Level 3 defined in the ISO-OSI Model.

Figure 2:
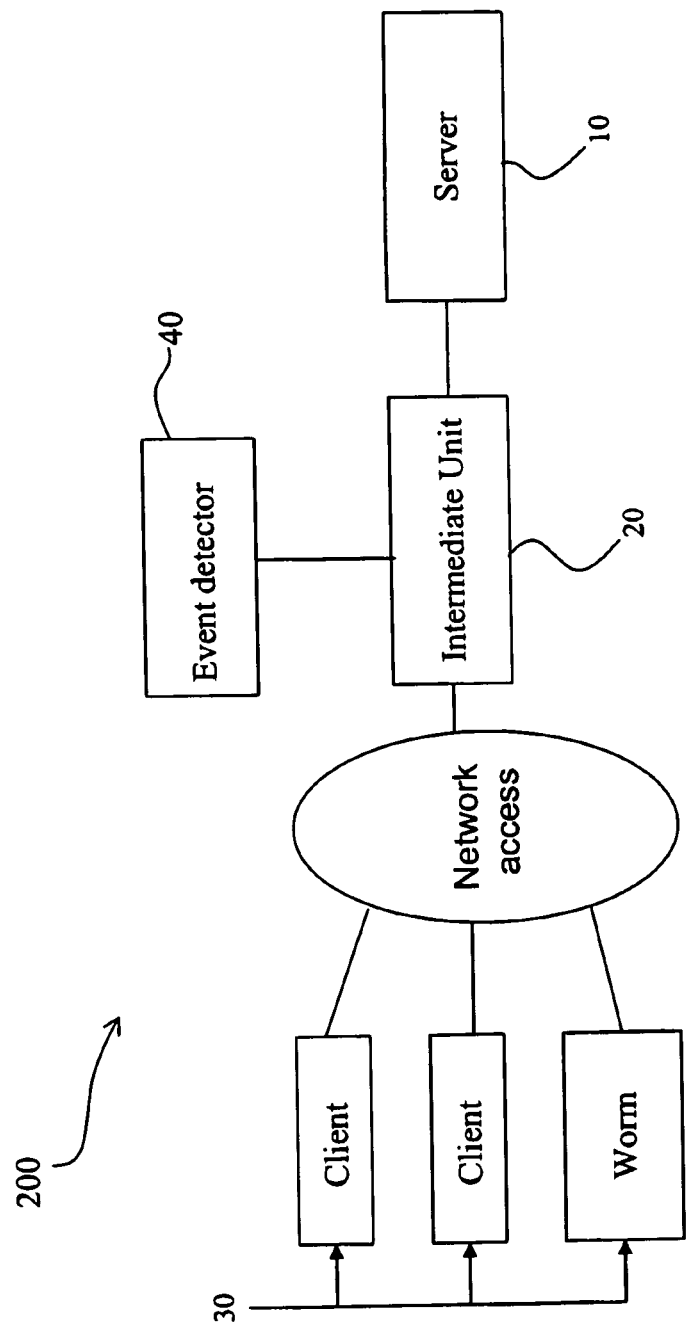
FIG. 2 shows a block diagram that schematically illustrates a protected server of a communication network in accordance with the invention.

With now reference to FIG. 2, in the system 200 according to the invention, an intermediate logic unit 20 is logically positioned between server 10 and clients 30. All the traffic directed to the server 10 is processed by the intermediate unit 20.

Intermediate unit 20 may be a computer, a stand alone logic unit or it maybe integrated with other communication or computing equipment. In the preferred embodiments, the unit 20 is a network layer element such as a firewall or a router. However, the intermediate unit is preferably able to operate also at the application level in order to process the application-level messages it receives. The application-level functionalities preferably performed by the intermediate unit are essentially the following: to recognize the protocol with which the message is defined (e.g., to recognize that the message is a SIP message) and to control the syntax and the semantic within a message (e.g., to understand that the message is a request message, such as a GET in HTTP).

Server 10 has a "real" network address, which is, as said, the address that identifies its location in the network and it is preferably a private network address, i.e., not publicly known or not communicated to clients. The real network address is mapped to a public network address, which is the address by which the server is known to the clients 30 and at which it has to be contacted in order to obtain the services desired. The intermediate unit 20 creates the mapping between the real address and the public network address, which is made available by the intermediate unit to clients. In other words, the intermediate unit hides the real address behind the public address.

The intermediate unit 20 is preferably logically connected to an event detector 40, which may alternatively, be physically separated from the unit 20 or integrated in the unit 20 as a single device.

The event detector 40 is a hardware or software unit specialized in the detection and in the signaling of events. For example, the event detector can be specialized to monitor and signal when the CPU consumption of the server is higher than a specific threshold. Alternatively, the detector can be specialized to monitor and signal when the statistical behavior of specific network messages sent to a server is over a predefined threshold. The event detector can also comprise a plurality of functionalities that detect different abnormal activities directed to the server to be protected.

In general, an event is a potentially dangerous situation for the server to be protected or monitored. That situation can be related to malicious activities or to unspecified technical problems arising during the normal "distribution" of the service (i.e. owing to a legitimate software agent not well configured that can cause a huge amount of unnecessary network traffic). The events usually cause an abnormal consumption of the available resources: CPU cycles, main memory, network bandwidth and so on. Such abnormal resources consumption leads to a DoS situation. Examples of event are: huge amount of CPU cycles compared to a normal situation, high network messages transmission rate and high main memory consumption rate.

The intermediate unit 20 has its own network address, which is preferably also a public address. Preferably, the publicly known address assigned to the server 10 coincides with the intermediate unit network address. In other words, the mapping created by the intermediate unit is between the real address of the server and the address of the intermediate unit. Therefore, according to a preferred embodiment of the invention, messages from the users 30 are directed towards the intermediate unit 20 and not the server 10, the network address of which is preferably hidden.

Under "normal" condition of message exchange between server and clients (i.e., no alert situation), the intermediate unit 20 contains an association pair between the public network address IPold and the "real" (private) network address IPreal of the server 10, stored for example in a table, so that when the incoming messages directed to the public network address reach the intermediate unit 20, they are routed towards the server 10 using its real network address. In other words, the intermediate unit hides the real address behind a public address.

This routing of the messages containing as the destination address the public address IPold associated to the server from the intermediate unit 20 to the server 10 is obtained preferably through a Network Address Translator (NAT) included in the intermediate unit.

More in detail, if one of the clients 30 wishes to send an application-level message, contained in a data packet, to the server 10 asking for a service, it sends the message using the public network address IPold assigned to the server 10. At the intermediate unit 20, NAT translates the source address of the IP header of the message to the "real" server network address IPreal and the message reaches its destination.

If an event triggers the event detector 40, an alert signal is generated by the detector and a challenge-response procedure is activated by the intermediate unit 20.

Figure 3:
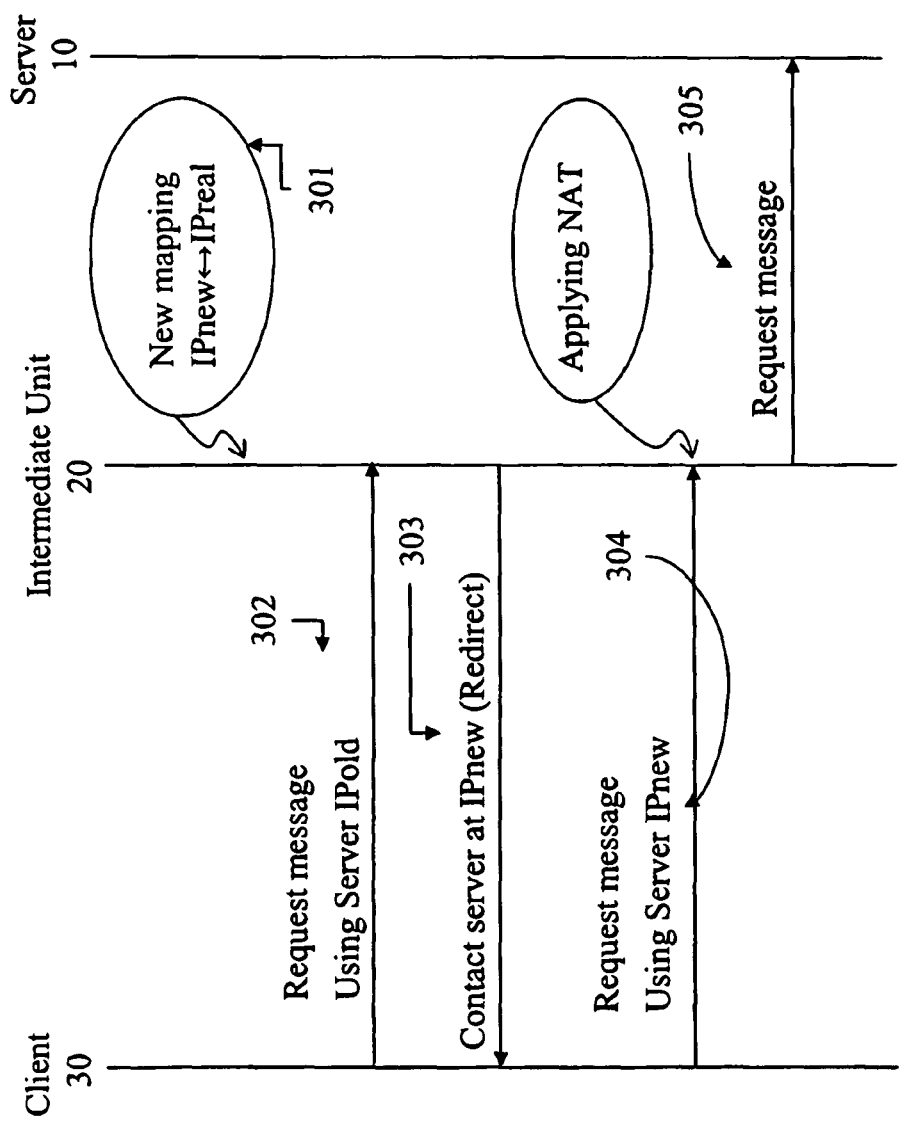
FIG. 3 is a diagram that schematically illustrates the method steps for controlling communication traffic according to the invention.

The event diagram of FIG. 3 shows schematically the steps undertaken by the method of the invention. Reference will be made in a non limiting way to data packet exchange in an IP network.

As a first step (step 301), a new association pair is created by the intermediate unit 20, mapping the "real" network address IPreal of the server 10 into a new public network address IPnew.

The old association pair that maps IPold to IPreal Is then cancelled or blocked.

For example, in case of usage of NAT, this new mapping is used in the NAT table to translate the header of the incoming data packets.

Upon creation of the new mapping, a message sent by client 30, legitimate or malicious, which is addressed to the old public network address IPold can not reach the server 10, because there is no more a correspondence between the network address used in the messages and the real network address IPreal of the server itself, being the first association pair blocked or cancelled (step 302).

In order to allow the clients 30 to use the services provided by the server 10, it is therefore necessary to inform them of the change of public network address.

The information is directly sent to the clients 30, preferably using a redirect function defined in the protocol used in the message exchange.

Preferably, the information regarding the new public network address IPnew associated to the server 10 is sent to clients 30 by the intermediate unit 20 (step 303) upon receipt of a request message addressed to the old public network address IPold (step 302). When a legitimate client is informed of the new public address, it will send the messages to the new address IPnew and thus the message will reach first the intermediate unit 20 (step 304) and then routed to the server 10 according to the new mapping (step 305).

In particular, when the packet containing the address IPnew is received by the intermediate unit, the NAT routes the packets by substituting in the IP header the new public network address IPnew with the real address IPreal of the server 10 and then by forwarding the modified packet to the server 10.

The information of change of public address has a high likelihood to be used by legitimate clients only. In fact, in order to react accordingly, i.e., to send a new message directed to the new public network address, it is necessary to parse the received message (step 303) at the application layer and "understand" the logic behind it. This requires employing computational resources that are generally not provided in a malicious agent.

The number of messages sent to the new public network address, and thus to server 10, is therefore significantly reduced because only legitimate users will send messages to the new network address, the messages sent to the old public address being disregarded.

Example 1

Figure 4:
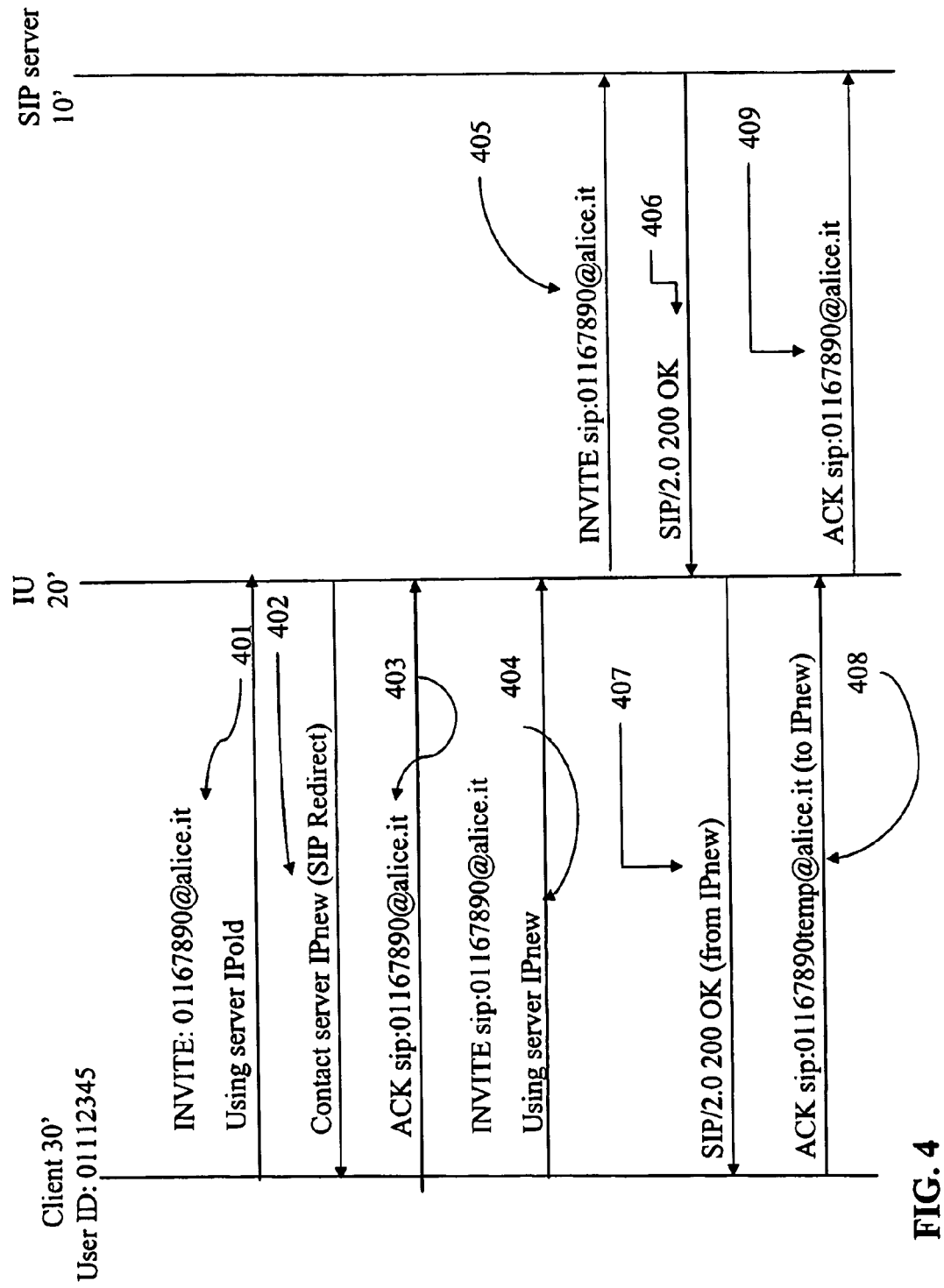
FIG. 4 is a diagram of a communication between a SIP server and User Clients according to a first embodiment of the method to control communication traffic according to the invention.

FIG. 4 schematically illustrates the steps of the method to control traffic in case of SIP communications between server and clients.

In this example, server 10 is a SIP server 10", having a public IP address IPold and a real (hidden) server IP address IPreal. A SIP server 10' can be considered a network element that receives requests in order to service them and sends back responses to those requests. Examples of SIP servers are proxies, user agent servers, redirect servers, and registrars.

Client 30' is a SIP User Agent, i.e., an IP phone, such as a PC that has phone capabilities. Intermediate unit 20' is a logic unit that operates as a network element, such as a router, but has some application-level "intelligence" that allows the unit to recognise the SIP protocol and to control the syntax and semantic of SIP messages, as explained in the following. According to an embodiment, the intermediate unit 20' can be a SIP firewall comprising other application-level logic functions (however not necessary to carry out the present invention), such as stateful analysis of packets within open sessions and management of access rules.

As known in the art, the Session Initiation Protocol (SIP) is an application-layer protocol for creating, modifying and terminating sessions with one or more participants. The sessions may include VoIP, Instant Messaging and video conferencing. In detail, SIP is a protocol particularly for IP-based communications which enables operation which are "telephone-like" and is focused on the signalling.

User Agents in a SIP network are identified by unique SIP addresses. A SIP address is similar to an e-mail address and is in the format of sip:userID@gateway.com. The user ID can be either a user name or an E.164 address.

User Agent 30' with user ID 01112345 sends a SIP request message, such as an INVITE message, which is substantially a request to indicate that it wants to make a telephone call with another User Agent (step 401). Other examples of SIP request messages are SUBSCRIBE and REGISTER, which indicate that the caller wants to join a service provided by the SIP server 10'.

In the SIP environment, when User Agent 30' initiates a call, the SIP request is sent to the SIP server 10' using the public IP address IPold assigned to the SIP server 10'. When the request message reaches the SIP Server 10', the SIP Server determines the path and then forwards the request to the callee using its IP address. The SIP request message contains the application-level address of the receiver of said request, such as the SIP URI of the callee. In the example of FIG. 4, the SIP URI is 01167890@alice.it to call user 01167890 in the domain alice.it.

The real IP address, IPreal, of the server 10' is not known to the User Agents, because there is a hiding mechanism performed by the SIP intermediate unit 20', only its public IP address IPold is given.

The INVITE message directed to the public IP address IPold of SIP server 10' is received and processed by the SIP intermediate unit 20', the IP address of which may correspond to IPold.

In the intermediate unit 20' an association pair is stored in a look-up table, which associates the public IP address, IPold, assigned to the server 10' to the real server IP address, IPreal, of the SIP server 10'.

In normal traffic conditions (i.e., no event is detected), through standard NAT mechanisms, the public IP address IPold contained in the packets of the SIP request is translated into the real server IP address, IPreal: whenever the NAT receives a packet with the public IP address, it reroutes it to the real server IP address. Therefore, the INVITE request is routed to the SIP server 10', which determines the path, and then forwards the request to the callee 01167890@alice.it (not shown in the figure).

In case of detection of an event, e.g., in case an alert signal is received by the intermediate unit 20' due for example to a sudden increase of SIP requests above a given threshold, the following counter-measures are adopted.

The first pair (first public address, IPold—real server IP address, IPreal) is either cancelled from the look-up table in the intermediate unit or blocked and a new association pair is created, i.e., second public IP address, IPnew—real server IP address, IPreal. This new mapping is thus used by NAT. The intermediate unit 20' thus performs an IP dynamic hiding, in which the real server IP address is always hidden, but associated with a different public IP address under an alert situation.

After the new (second) correspondent pair creation by the intermediate unit 20', User Agent 30' still sends its request to the old public IP address of the SIP server 10' (step 401). Upon the receipt of such request, the intermediate unit 20' sends to the User Agent 30' a SIP REDIRECT message, such as a 3xx redirection response, in order to inform the same of the public IP address change and to provide the User Agent with the new public IP address, IPnew (step 402).

A REDIRECT message is thus sent to all User Agents 30' trying to contact the SIP server 10' using the old public IP address IPold.

Sending this type of redirect message is not demanding from a computational point of view because it is not needed to understand the meaning of the received messages (or to understand the service required), for instance by parsing the received message. When the association pair is changed, the intermediate unit 20' sends this redirect message automatically whatever message it receives.

As it is clear from the above, the redirect message is not a real "redirection" to a different SIP server, being substantially a virtual redirection to always the same server (having always the same real server IP address IPreal), but mapped to a different public IP address. No additional server is needed.

In case of a legitimate User Agent 30', the redirect message received from the intermediate unit 20' triggers a second INVITE message, analogous to the first INVITE message of step 401, but in this case the packet containing the message is addressed to the new public IP address IPnew (step 404). Optionally (it may be defined in the standard used), the legitimate User Agent 30' may also sent an ACK message to the old IP public address IPold in order to acknowledge reception of the REDIRECT message sent by the intermediate unit 20' (step 403).

This second request message addressed to IPnew is sent to the server 10' and it is again processed by the intermediate unit 20' (step 404). Using NAT, the second request message is routed to the SIP server 10' (step 405). The server 10' will then offer the requested service.

Upon completing the desired service requested by the User Agent 30', the SIP server 10' sends a successful response, such as a 2xx response, to the User Agent (step 406). The response, which passes through the intermediate unit 20', is received by the User Agent 30' and it appears to be sent by the new public IP address IPnew (step 407).

Optionally, in a following step (step 408) the legitimate User Agent 30' may also send an ACK message, this time to the to new IP public address, in order to acknowledge reception of the 2xx message sent by the SIP server 10' at step 407. This ACK message reaches the intermediate unit 20' where NAT translates the IP address from IPnew to IPreal and routes the message to the SIP server 10' (step 409).

In case of a malicious User Agent, its IP address as it appears from the SIP invite message may be a forged (spoofed) source IP address, therefore it may not be reached by the REDIRECT message send by the intermediate unit 20'. In any case, even if the REDIRECT message reaches the malicious User Agent, generally the latter does not respond, because answering to the received application-level message with another application-level message, would involve the deployment of computational resources in order to operate at the application level. Consequently, the power and the effectiveness of the malicious agent attack is slowed down.

As known, in the SIP protocol, network layer address information is sent also within the application-level messages. For example, the IP address of the caller User Agent is contained in the SIP request message and the response sent by the server, such as the "200 OK" message, contains the real IP address of the server in the so-called VIA header of the message. Therefore, by operating a NAT mechanism only at the network/transport layer, i.e., by carrying out only a translation of the IP address and/or TCP/UDP port number, the information received by the server or by the User Agent could be made invalid. This is solved in the present example using suitable software within the intermediate unit, which operates at both the network/transport level and at the application-level, by simply adjusting the information carried at the application level, whenever necessary, for example by modifying the VIA header, in order to reflect the information carried out at the lower layer, e.g., the IP address.

As shown, the intermediate unit 20' In order to protect the SIP server 10' from DoS attacks, performs a dynamic IP hiding using NAT, which involve only functions performed at the network level. Therefore, with the possible exception of the software needed in order to operate NAT on SIP messages correctly, the intermediate unit 20' operates only at the network layer.

The messages transmitted by the User Agents are not verified, but they are all virtually redirected to the new IP address. The User Agent, on the other hand, operates at the application layer, because it has to "understand" the redirect message received by the intermediate unit 20' and respond accordingly. The part which is computationally demanding is therefore left to the User Agent.

Example 2

Figure 5:
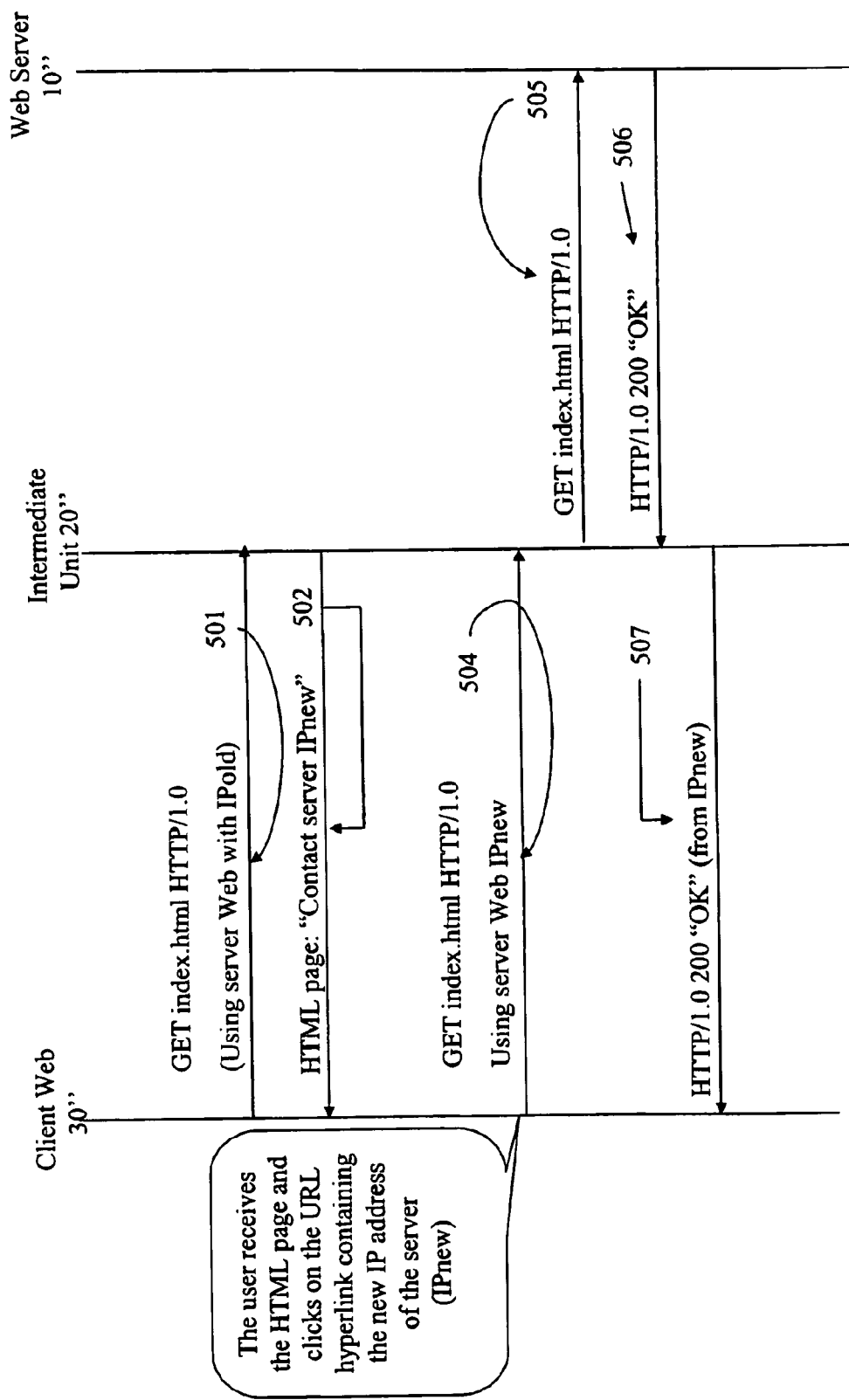
FIG. 5 is a diagram of a HTTP communication between a Web Server and clients according to a second embodiment of the method to control communication traffic according to the invention.

FIG. 5 schematically illustrates the method to control traffic in case of Hypertext Transfer Protocol (HTTP) traffic in the communication network. As known, HTTP is a request/response protocol between clients and servers.

In this example, server 10 is a Web server 10", having a (real) server IP address IPreal, which stores or creates resources such as HTML files or images. Clients 30" can be a web browser, spider or other end-user tool. Intermediate unit 20" can be a firewall of the Web Server 10".

A User Agent 30" initiates a request, for example through a Web browser, of the following Universal Resource Locator (URL): http://www.mycompany.com/index.html. As known, a URL is a name that identifies a hypertext page. Through this request, the HTTP is used to retrieve the document of interest, that is the HTML file index.htm from the Web server named www.mycompany.com. HTTP operates by establishing a Trasmission Control Protocol (TCP) connection to a particular port (generally port 80). The request message contains a request line, for example a GET index.html HTTP/1.0 in order to obtain the HTML file. Other request messages may be sent by the User Agent 30" to the server 10", such as a HEAD message.

The Web server 10" to be contacted by this request message is identified by its domain name www.mycompany.com. The Domain Name System protocol (DNS) converts the domain name www.mycompany.com in its 32-bit IP address, which is the public IP address associated to the Web server 10".

The User Agent 30" opens a connection according to the TCP protocol towards the IP address associated to the Web server 10" and transmits the HTTP GET message to the Web server itself. IP packets including the application-level messages sent by the User Agent 30" are processed by the intermediate unit 20", the IP address of which corresponds to the public IP address assigned to the server.

In the intermediate unit 20", an association pair is stored (public IP address, IPold—real IP address, IPreal), which associates the public IP address assigned to the server to the real IP address of the Web server 10".

At the intermediate unit 20", according to the above identified association pair, a NAT mechanism translates the public IP address, IPold, in the packets into the real IP address, IPreal, of the Web server 10", which receives the GET message. Therefore, the Web server is protected by the intermediate unit 20" which hides its real IP address.

Upon receipt of the request, the Web server 10" sends a message the body of which is the requested file (or other messages in case for example of errors), "index.html", and it optionally includes a status line as the first line of the HTTP response.

In case an alert signal is received by the intermediate unit 20", e.g., due to a large amount of GET requests, the intermediate unit 20" operates as follows.

The first association pair (IPold—IPreal) is either cancelled or blocked in the intermediate unit and a new association pair is created (second public IP address, IPnew—IPreal). This new mapping is used by NAT: NAT re-writes the destination address of the IP packets as they pass through the intermediate unit 20". The intermediate unit 20" thus perform an IP dynamic hiding, in which the real server IP address is always hidden and associated with different public IP addresses, in dependence on the presence of a traffic anomaly, i.e., of an event.

After the new association pair creation by the intermediate unit 20", User Agent 30" still sends its HTTP requests to the old public IP address IPold related to the Web server 10" (step 501).

In order to inform the User Agents 30" of the change in the public IP address, the intermediate unit 20" sends to the User Agents, upon receipt of a GET request addressed to the old public IP address IPold, a default HTML page containing the new public IP address IPnew, preferably in the form of a URL hyperlink (step 502).

As in Example 1, sending this type of messages is not demanding from a computational point of view, because it is not needed to understand the meaning at the application level of the received messages. It is however preferred that the intermediate unit is configured to understand the syntax of the received message in order to control if the message is a request message, such as a GET, so that redirection is operated only to request messages.

In addition, no real redirection is performed, but only a "virtual" redirection to the same Web server 10", to which however a new public IP address IPnew is assigned.

In case of a legitimate User Agent 30", the HTML page received from intermediate unit 20" triggers a new GET request, for example by clicking to the indicated new URL. This new request, with the new IP address IPnew, is again received by the intermediate unit 20" (step 504) and, using NAT, routed to the Web server 10" (step 505). The server 10" will then offer the requested web page (step 506 and 507).

In case of a malicious User Agent, the receipt of this default HTML page does not trigger any further action because the malicious agent is not able to correctly process of the message. Therefore it continues to send GET request to the old public IP address, which will not reach the Web server 10".

In order to protect the Web server from DoS attacks, the intermediate unit 20" performs a dynamic IP hiding using NAT and a virtual redirection of the messages, which are functions performed at the network layer. No additional software is needed in order to operate NAT on HTTP messages correctly, being HTTP a NAT-friendly protocol.

The invention claimed is:

1. A method to control communication traffic in a communication network, said traffic comprising application-level messages between a client and a server having a private network address, comprising the steps of:
    receiving from said client a request message sent to a first public network address associated with said private network address of said server;
    processing said request message at an intermediate logic unit logically positioned between said client and said server;
    receiving an alert signal indicating a malicious internet attack of said server at said intermediate logic unit; and, upon receipt of said alert signal:
    mapping said private network address of said server to a second public network address at said intermediate logic unit;
    instructing said client to send said request message to said second public network address; and
    routing to said server only request messages directed to said second public network address,
    wherein, before the step of receiving said request message, a step of hiding said private network address of said server is performed by mapping said first public network address to said private network address of said server at said intermediate logic unit.

2. The method to control communication traffic according to claim 1, wherein said step of instructing said client to send said request message to said second public network address comprises a step of transmitting a redirection message to said client containing said second public network address of said server.

3. The method to control communication traffic according to claim 2, wherein the step of transmitting a redirection message to said client is performed upon receipt of a request message by said intermediate logic unit.

4. The method to control communication traffic according to claim 2, wherein said redirection message is a message comprising the second public network address of said server.

5. The method to control communication traffic according to claim 1, wherein said step of routing to said server only said request message directed to said second public network address uses a network address translator mechanism.

6. The method to control communication traffic according to claim 1, comprising, after the step of hiding said private network address of said server, a step of routing to said server, request messages directed to said first public network address.

7. The method to control communication traffic according to claim 6, wherein said step of routing to said server said request messages directed to said first public network address uses a network address translator mechanism.

8. The method to control communication traffic according to claim 1, wherein said communication network is a wide-area network.

9. The method to control communication traffic according to claim 1, wherein said first and second public network addresses are public internet protocol addresses.

10. The method to control communication traffic according to claim 1, wherein said private network address is a private internet protocol address.

11. The method to control communication traffic according to claim 1, wherein said intermediate logic unit is a network-layer unit.

12. The method to control communication traffic according to claim 1, further comprising, before the step of receiving an alert signal, a step of generating an alert signal as a result of an event detection.

13. The method to control communication traffic according to claim 1, wherein said application-level messages are session initiation protocol request messages.

14. The method to control communication traffic according to claim 1, wherein said redirection message is a session initiation protocol redirect message.

15. The method to control communication traffic according to claim 1, wherein said request message is a hypertext transfer protocol request message.

16. The method to control communication traffic according to claim 1, wherein said server is a web server.

17. A system for controlling communication traffic in a communication network, said traffic comprising application-level messages, comprising:
  a server having a private network address;
  a client configured to transmit a request message to a first public network address associated with said private network address of said server;
  an intermediate logic unit logically positioned between the client and the server, said intermediate logic unit configured to:
    before receiving said request message from said client, hide said private network address of said server by mapping said first public network address to said private network address of said server; and
    receive and process said request message; and
  an event detector capable of detecting an event and sending an alert signal indicating a malicious internet attack of said server to said intermediate logic unit,
  wherein said intermediate logic unit is configured so as, upon receipt of said alert signal indicating the malicious internet attack of said server, to map said private network address of said server to a second public network address, to send an instruction to said client to send said request message to said second public network address and to route to said server only request messages directed to said second public network address.

18. The system according to claim 17, wherein said instruction to said client to send said request message to said second public network address is a redirect message.

19. The system according to claim 17, wherein said intermediate logic unit is configured to hide said private network address of said server by mapping said first public network address of said server to said private network address of said server.

\* \* \* \* \*